(12) United States Patent
Chang et al.

(10) Patent No.: US 10,500,833 B2
(45) Date of Patent: Dec. 10, 2019

(54) 3D PRINTING DEVICE AND RESUME PRINTING METHOD THEREOF

(71) Applicants: XYZprinting, Inc., New Taipei (TW); Kinpo Electronics, Inc., New Taipei (TW)

(72) Inventors: Chia-Yuan Chang, New Taipei (TW); Yu-Jie Yang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 242 days.

(21) Appl. No.: 15/611,801

(22) Filed: Jun. 2, 2017

(65) Prior Publication Data

US 2018/0272624 A1 Sep. 27, 2018

(30) Foreign Application Priority Data

Mar. 22, 2017 (TW) .............................. 106109463 A (51) Int. Cl.
| | |
|---|---|
| *B33Y 50/02* | (2015.01) |
| *B33Y 30/00* | (2015.01) |
| *B29C 64/386* | (2017.01) |
| *B29C 64/393* | (2017.01) |
| *B29C 64/112* | (2017.01) |
| *B33Y 10/00* | (2015.01) |

(52) U.S. Cl.
CPC ............ *B33Y 30/00* (2014.12); *B29C 64/112* (2017.08); *B29C 64/386* (2017.08); *B29C 64/393* (2017.08); *B33Y 50/02* (2014.12); *B33Y 10/00* (2014.12)

(58) Field of Classification Search
None
See application file for complete search history.

(56) References Cited

U.S. PATENT DOCUMENTS

| | | | |
|---|---|---|---|
| 10,052,822 B1* | 8/2018 | Sait | B29C 64/386 |
| 2005/0209730 A1* | 9/2005 | Grund | G05B 19/4067 |
| | | | 700/186 |
| 2013/0101728 A1* | 4/2013 | Keremes | B22F 3/1055 |
| | | | 427/8 |
| 2015/0170009 A1* | 6/2015 | Cudak | G06K 15/1809 |
| | | | 358/1.15 |

(Continued)

FOREIGN PATENT DOCUMENTS

| | | |
|---|---|---|
| JP | 2016177689 | 10/2016 |
| TW | 201416966 | 5/2014 |

(Continued)

OTHER PUBLICATIONS

"Office Action of Taiwan Counterpart Application", dated Feb. 18, 2019, p. 1-p. 7.

(Continued)

*Primary Examiner* — Thomas C Lee
*Assistant Examiner* — Gary Collins
(74) *Attorney, Agent, or Firm* — JCIPRNET (57) ABSTRACT

A 3D printing device and a resume printing method thereof are provided. The method includes: executing printing commands sequentially to control a print head for printing; obtaining a first printing command executed when a printing interruption occurs, and resuming printing according to the first printing command.

10 Claims, 2 Drawing Sheets

(56) References Cited

U.S. PATENT DOCUMENTS

| | | |
|---|---|---|
| 2015/0210007 A1 | 7/2015 | Durand et al. |
| 2017/0036399 A1 | 2/2017 | Cheung |
| 2017/0050388 A1 | 2/2017 | Minardi et al. |
| 2018/0015655 A1* | 1/2018 | Gheorghescu .......... B29C 48/18 |
| 2018/0113434 A1* | 4/2018 | Shapiro ................ G05B 19/406 |
| 2018/0150062 A1* | 5/2018 | Shapiro ................ G05B 19/409 |
| 2018/0281384 A1* | 10/2018 | Isal Cortes ............. B41J 2/165 |

FOREIGN PATENT DOCUMENTS

| | | |
|---|---|---|
| TW | 201540557 | 11/2015 |
| WO | 2009108543 | 9/2009 |
| WO | 2017011245 | 1/2017 |
| WO | 2017039858 | 3/2017 |

OTHER PUBLICATIONS

"Search Report of Europe Counterpart Application", dated Mar. 8, 2018, p. 1-p. 5, in which the listed references were cited.

* cited by examiner

3D PRINTING DEVICE AND RESUME PRINTING METHOD THEREOF

CROSS-REFERENCE TO RELATED APPLICATION

This application claims the priority benefit of Taiwan application serial no. 106109463, filed on Mar. 22, 2017. The entirety of the above-mentioned patent application is hereby incorporated by reference herein and made a part of this specification.

BACKGROUND

Field of the Invention

The invention is directed to a printing method of a printing device and more particularly, to a three-dimensional (3D) printing device and a resume printing method thereof.

Description of Related Art

Along with the development of technologies, a three-dimensional (3D) printing technique has becomes one of the most important techniques under development. The 3D printing technique is also referred to as an additive manufacturing (AM) technique which is a type of rapid prototyping (RP) technique and can establish a 3D object through a layer-by-layer printing manner based on a digital forming drawing file by using bonding materials, such as powdered metals or plastic materials.

A currently available 3D printing device can move a print head to a specific position for 3D printing by executing printing commands. When the 3D printing device is forced to shut down due to occurrence of reasons for power failure, material shortage or unexpected failure during the process of the 3D printing, the 3D printing device, after being restarted, cannot obtain an actual execution progress of the printing commands while the previous forced shutdown occurs, which causes the 3D printing device to fail to resume printing. As a result, a printed semi-product cannot be used and wasted.

In order to overcome the aforementioned issue, may manufacturers install a uninterruptible power supply (UPS) on the 3D printing device to ensure that the 3D printing device can completely execute the current printing command when the forced shutdown occurs. However, the installation of the UPS easily leads to cost and volume increase of the 3D printing device. Thus, whether there is another way to allow the 3D printing device to resume the printing method when the printing interruption occurs is one of the goals that every manufacturer try to find out.

SUMMARY

The invention provides a three-dimensional (3D) printing device and a resume printing method thereof which can calculate an interruption position when a printing interruption occurs after the printing interruption occurs to the 3D printing device. Thus, when resuming printing, the 3D printing device can continue to perform a previous printing operation from a correct interruption position.

A resume printing method adapted for a 3D printing device is provided by the invention. The method includes the following steps: executing a plurality of printing commands sequentially to control a print head of the 3D printing device for printing; and, when a printing interruption occurs, obtaining a first printing command executed while the printing interruption occurs and resuming printing according to the first printing command.

According to another aspect, a 3D printing device is provided by the invention. The 3D printing device includes a print head and a controller. The controller is coupled to the print head and configured to execute a plurality of printing commands sequentially to control the print head for printing. When the printing interruption occurs, the controller performs the following steps: obtaining a first printing command executed when the printing interruption occurs and resuming printing according to the first printing command.

Based on the above, the invention provides a 3D printing device and a resume printing method thereof which can the interruption position when the printing interruption occurs after the printing interruption occurs to the 3D printing device. When the 3D printing device is about to resume printing, the controller can control the print head to move to the correct interruption position and continue to complete the printing command which is unfinished when the printing interruption occurs. Thereby, the 3D printing device of the invention can correctly resume 3D printing, without an uninterruptible power supply (UPS) installed thereon when the printing interruption occurs.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An unexpected printing interruption of a three-dimensional (3D) printing device usually occurs during the execution of a certain printing command. It is assumed that a certain printing command may be used to control a print head to move in a specific rate for a time period. When the unexpected interruption occurs as the time period does not yet end, the 3D printing device, after being restarted, can neither determine the exact time point in the time period that the interruption occurs nor determine the position where the print head is located when the printing interruption occurs. In other words, in order to resume printing after the printing interruption occurs, the 3D printing device has to be capable of calculating the position where the print head is located when the printing interruption occurs, thereby continue to perform the previous printing operation. In addition, after the 3D printing device is restarted, there should be a way to find out which printing command is executed when the printing interruption occurs.

Accordingly, a 3D printing device and a resume printing method thereof according to the embodiments of the invention can, after a printing interruption occurs to the 3D printing device, know a specific printing command executed when a printing interruption occurs according to information stored in a non-volatile memory and calculate an interruption position when the printing interruption occurs by a controller in the 3D printing device according to an execution time length of the current printing command. Thus, when resuming printing, the 3D printing device can continue to perform a previous printing operation from the correct interruption position.

Figure 1:
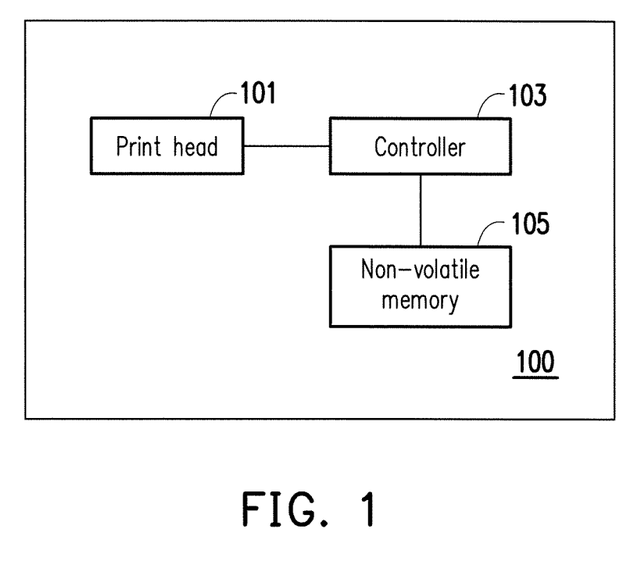
FIG. 1 is a schematic diagram illustrating a three-dimensional (3D) printing device according to an embodiment of the invention.

FIG. 1 is a schematic diagram illustrating a 3D printing device according to an embodiment of the invention. Referring to FIG. 1, a 3D printing device 100 may include a print head 101 and a controller 103. The 3D printing device 100 may be, for example, a 3D printer. The print head 101 may perform printing by using, for example, one of a selective laser sintering (SLS) technique, a selective laser melting (SLM) technique, a plaster-based 3D printing (PP) technique and a fused deposition modeling (FDM) technique. The controller 103 may be a programmable device for general purpose or special purpose, for example, a central processing unit (CPU), a micro-processor or an embedded controller.

The controller 103 is coupled to the print head 101 and executes a plurality of printing commands sequentially to control the print head 101 for printing. The printing commands may be, for example, G-codes (also referred to as RS-274), and examples of the G-codes are listed in Table 1.

TABLE 1

| Column No. | G-code Command |
| --- | --- |
| 10767 | G1 X08.000 Y44.000 E4.74325 |
| 10768 | G1 X15.000 Y20.000 F1200.000 E4.74329 |
| 10769 | G1 X24.000 Y32.000 E4.76447 |
| 10770 | G1 X27.000 Y36.000 E4.79192 |

As shown in Table 1, the 3D printing device 100 may perform a 3D printing operation by sequentially executing multiple columns of G-codes. A G-code mainly includes a destination position and a print head rate. A G-code of column No. 10768 is taken as an example for description. The field "F1200.000" represents that the 3D printing device 100 controls the print head to move in a rate of 1200 mm/min, namely, "F1200.000" is the print head field in the G-code. The field "X15.000 Y20.000" represents a destination coordinate (which is i.e., (15, 20)) where the print head is finally located after the execution of the G-code of column No. 10768 is completed, namely, "X15.000 Y20.000" refers to the X-axial and the Y-axial coordinates of the G-code. A part of the G-codes have Z-axial coordinates, which indicates that the height of the print head needs to be adjusted. The field "E4.74329" represents a material-feeding speed of the print head. A part of the G-codes do not have the rate fields (e.g., "FXXX") or the material-feeding speed fields (e.g., "EXXX") of the print head, which indicates that the 3D printing device 100 uses rate field information or material-feeding speed field information included in a previous G-code as the rate or the material-feeding speed included in the G-code. For instance, when the controller 103 executes the G-code of column No. 10768, the print head 101 moves in the rate of 1200 mm/min toward the destination coordinate (15,20) and feeds the material in a speed of 4.74329 mm/min during the process of moving. In the same way, when the controller 103 executes a G-code of column No. 10769, the print head 101 continues to move in the rate of 1200 mm/min toward a destination coordinate (24,32) and feeds the material in a speed of 4.76447 mm/min during the process of moving.

In other embodiments of the invention, the 3D printing device 100 may further includes a non-volatile memory 105. The non-volatile memory 105 may be, for example, an NAND flash memory or an NOR flash memory. The non-volatile memory 105 is coupled to the controller 103 and periodically records a count value according to a predetermined cycle. The controller 103 adds the count value by 1 when executing any printing command. While the controller 103 executes any printing command, the non-volatile memory 105 may record a count value corresponding to the printing command.

For instance, when the controller 103 executes a G-code of a first column, the controller 103 may further record a count value "1" corresponding to the G-code of the first column by the non-volatile memory 105. Then, when the controller 103 executes a G-code of a second column, the controller 103 may, besides adding the count value by 1, further record the updated count value, i.e., the count value "2" corresponding to the G-code of the second column by the non-volatile memory 105.

During the 3D printing process, if a printing interruption occurs due to shutdown, the controller 103 may obtain a first printing command executed when the printing interruption occurs and resumes printing according to the first printing command. To be specific, the controller 103 may executes the following procedure to enable the 3D printing device 100 to resume printing from a position where the printing is interrupted. First, the controller 103 reads the count value from the non-volatile memory 105 to obtain the first printing command corresponding to the count value and obtain a time period from a time when the 3D printing device 100 executes the first printing command to a time when the printing interruption occurs. For instance, taking a part of the G-codes listed in Table 1 for example, in which the G-code of column No. 10768, the G-code of column No. 10769 and a G-code of column No. 10770 are sequentially recorded. When the printing interruption occurs, the controller 103 may read the count value from the non-volatile memory 105. If the count value read from the non-volatile memory 105 is 10769, the controller 103 may accordingly determine that the 3D printing device 100 is executing the G-code of column No. 10769 while the interruption occurs. In other words, the controller 103 employs the G-code of column No. 10769 as the first printing command. Likewise, if it is assumed that the count value read by the controller 103 is 10770 when the printing interruption occurs, the controller 103 may accordingly determine the 3D printing device 100 is executing the G-code of column No. 10770 while the interruption occurs. In other words, the controller 103 employs the G-code of column No. 10770 as the first printing command.

The 3D printing device 100 may also adjust the predetermined cycle for recording the count value according to use demands or an actual hardware processing speed. For example, when the 3D printing device 100 has poor hardware capability, the 3D printing device 100 may prolong the predetermined cycle for recording the count value, such that the non-volatile memory 105 may record the count value once as the controller 103 executes any two or three columns of printing commands. Taking the predetermined cycle of recording as two columns of printing commands are executed for example, when the controller 103 executes the G-code of the first column, the controller 103 records a count value "1" corresponding to the G-code of the first column by the non-volatile memory 105. Then, when the controller 103 executes the G-code of the second column, the controller 103, though adds the count value by 1, does not record the count value by the non-volatile memory 105. Thereafter, the controller 103, when executing the G-code of a third column, records a count value "3" corresponding to the G-code of the third column by the non-volatile memory 105. A user may adjust the length of the predetermined cycle according to use demands, which is not limited in the invention.

The time period from the time when the first printing command is executed to the time when the printing interruption occurs may be obtained by, for example, a timer inside the controller 103, which is not limited in the invention. The timer inside the controller 103 of the invention may temporarily store time length information related to a currently executed command during the execution, and erases the time length information until the execution of the currently executed command is completed. In other words, when the printing interruption occurs, the timer inside the controller 103 stores time length information related to a previously executed command during the previous execution. The time length information may be employed as a time period from a time when a certain G-code starts to be executed to a time when a printing interruption occurs. For instance, taking the G-codes listed in the Table 1 for example, it is assumed that after the printing interruption occurs, the count value that may read from the non-volatile memory 105 by the controller 103 is 10768, and the G-code of column No. 10769 is employed as the first printing command. On the other hand, the controller 103 may also obtain the time period from the time when the G-code of column No. 10769 starts to be executed to the time when the printing interruption occurs from the timer inside the controller.

After obtaining the first printing command and the time period from the time when the first printing command is executed to the time when the printing interruption occurs, the controller 103 may calculate an interruption position when the printing interruption occurs according to the first printing command, a second printing command executed before the first printing command and the period from the time when the first printing command is executed to the time when the printing interruption occurs and controls the print head 101 to resume printing from the interruption position according to the first printing command. For instance, taking the G-codes shown in Table 1 for example, if it is assumed that the printing interruption occurs during the execution of the G-code of column No. 10769, and the count value stored by the non-volatile memory 105 is 10769, the controller 103 may calculate the interruption position when the printing interruption occurs according to the G-code of column No. 10769 (i.e., the first printing command) corresponding to the count value 10769, the G-code of column No. 10768 (i.e., the second printing command) executed before the G-code of column No. 10769 and the time period from the time when the G-code of column No. 10769 starts to be executed to the time when the printing interruption occurs.

Figure 2:
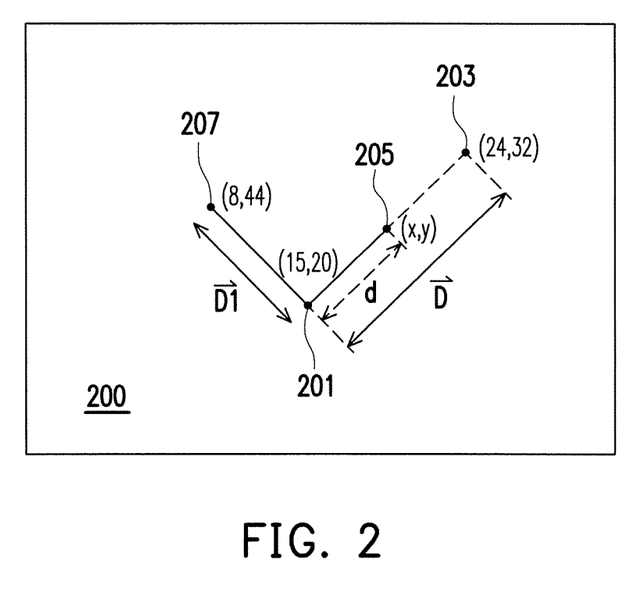
FIG. 2 schematically illustrates a printing platform according to an embodiment of the invention and an example of calculating the interruption position.

A method of calculating the interruption position when the printing interruption occurs will be specifically described below. Referring to FIG. 2 and Table 1, FIG. 2 schematically illustrates a printing platform 200 according to an embodiment of the invention and an example of calculating the interruption position by the 3D printing device 100. Taking the embodiment illustrated in FIG. 2 and the G-codes shown in Table 1 for example, it is assumed that the printing interruption occurs during the execution of the G-code of column No. 10769, and the count value currently stored by the non-volatile memory 105 is the count value 10769 corresponding to the G-code of column No. 10769. By reading from the non-volatile memory 105, the controller 103 may learn that the 3D printing device 100 is executing the G-code of column No. 10769 when the interruption occurs. In addition, the controller 103 also learn a time period tp (which is not shown) from the time when the G-code of column No. 10769 starts to be executed to the time when printing interruption occurs by, for example, the timer inside the controller 103. The controller 103, whenever recording the count value, returns the timer to 0 and restarts the calculation until the next count value is recorded. Besides using the timer inside the controller 103, the controller 103 may also obtain the aforementioned time period tp by using, for example, a microcontroller unit (MCU) coupled to the controller 103, but the invention is not limited thereto.

The controller 103 no only obtains the time period tp, but also calculates a displacement vector and a displacement amount corresponding to the displacement vector according to a printing position included in the first printing command and a printing position included in the second printing command. Taking the embodiment illustrated in FIG. 2 and the G-codes shown in Table 1 for example, if it is assumed that the first printing command is the G-code of column No. 10769, and the second printing command is the G-code of column No. 10768, the controller 103 may deduct a coordinate of a printing position (X24.000,Y32.000) included in the G-code of column No. 10769 by a coordinate of a printing position (X15.000,Y20.000) included in the G-code of column No. 10768, thereby calculating a displacement vector between a point 201 corresponding to the printing position included in the second printing command (i.e., the G-code of column No. 10768) and a point 203 corresponding to the printing position included in the first printing command (i.e., the G-code of column No. 10769) by $\overline{D}=(24-15,32-20)=(9,12)$ and calculating a displacement amount by $|\overline{D}|=|(9,12)|=15$. In addition, the controller 103 also calculates a moving distance d according to a print head moving rate (i.e., command F1200.00 in the G-code of column No. 10768) corresponding to the first printing command (i.e., the G-code of column No. 10769) and the time period tp. In the present embodiment, if it is assumed that the print head moving rate is 1200 mm/min (which is equal to 20 mm/sec), and the time period tp from the time when the first printing command is executed to the time when the printing interruption occurs is 0.25 seconds, the moving distance d as depicted in FIG. 2 may be presented as d=20×0.25=5 mm.

After obtaining the printing position included in the first printing command (i.e., the printing position (X24.000, Y32.000) included in the G-code of column No. 10769), the displacement vector D, the displacement amount |D| and the moving distance d, the controller 103 may obtain an interruption position 205 according to the printing position included in the second printing command (i.e., the printing position (X15.000,Y20.000) included in the G-code of column No. 10768), the displacement vector D, the displacement amount |D| and the moving distance d. A coordinate (x,y) of the interruption position may be obtained through the following formula:

$(x,y)$=Printing position of second printing command+ $\overline{D} \times d/|\overline{D}|$ Accordingly, the coordinate (x,y) of the interruption position 205 may be calculated as follows:

$$(x,y)=(15,20)+(9,12)\times 5/15=(18,24)$$

It should be noted that when the time period tp from the time when the 3D printing device 100 executes the first printing command to the time when the printing interruption occurs is 0, it indicates that the first printing command is just executed, and the print head 101 does not start to move when the printing interruption occurs, and in this circumstance, the controller 103 may employ the printing position included in the second printing command as the interruption position to continue the printing. For instance, when the printing interruption occurs, the first printing command is the G-code of column No. 10769, and the time period tp is 0, the controller 103 may employ the printing position (X15.000,Y20.000) of the G-code of column No. 10768 as the interruption position to continue the printing.

In the embodiment illustrated in FIG. 2, the 3D printing device 100 calculates the position where the printing is interrupted mainly according to the first printing command (e.g., the G-code of column No. 10769 in Table 1) corresponding to the count value and the second printing command (e.g., the G-code of column No. 10768 in Table 1) executed before the first printing command. However, as the predetermined cycle used by the non-volatile memory 105 to record the count value differs, the corresponding relationship between the first printing command and the count value may also vary. It is assumed that the non-volatile memory 105 records the count value according to a long predetermined cycle, for example, the non-volatile memory 105 records the count value once as each two columns of printing commands are executed. Accordingly, the non-volatile memory 105 is incapable of recording the corresponding count value one by one when each column of G-code is executed. Therefore, when the interruption occurs, the controller 103 is incapable of accurately learning which column of G-code is being executed by the 3D printing device 100 when the interruption occurs. However, according to an embodiment of the invention, the position where the printing is interrupted may be calculated even though the controller 103 is incapable of accurately learning which column of G-code is being executed when the interruption occurs. Specifically, the controller 103 may estimate the G-code which is being executed by the 3D printing device 100 when the interruption occurs according to the first printing command corresponding to the current count value, the second printing command executed before the first printing command, the time period from the time when the first printing command starts to be executed to the time when the printing interruption occurs and the print head moving rate corresponding to the first printing command, so as to employ the G-code as the new first printing command to calculate the position where the printing is interrupted.

Taking FIG. 2 and the G-codes shown in Table 1 for example, in the present embodiment, it is assumed that when the printing interruption occurs, the count value stored by the non-volatile memory 105 is the count value 10768 corresponding to the G-code of column No. 10768. In other words, the first printing command in this case is the G-code of column No. 10768. By reading from the non-volatile memory 105, the controller 103 may know that the printing interruption occurs after the G-code of column No. 10768 starts to be executed. It is assumed that a time period tp2 (which is not shown) from a time when the G-code of column No. 10768 starts to be executed to the time when the printing interruption occurs is 0.25, and a print head moving rate corresponding to the G-code of column No. 10768 is 20 mm/sec. It may be learned that a start position of the G-code of column No. 10768 is a point 207 according to a printing position included in a G-code of column No. 10767 (i.e., the second printing command), and it may be learned that a start position of the G-code of column No. 10769 is the point 201 according to the printing command in the G-code of column No. 10768.

Then, the controller 103 may calculate a displacement amount between the point 207 and the point 201 by |$\overline{DT}$|=|(15,20)−(8,44)|=25 mm. Thereby, an execution time period tp1 (which is not shown) of the first printing command (i.e., the G-code of column No. 10768) may be calculated according to the displacement amount |$\overline{D}$| and the print head moving rate (20 mm/sec) by tp1=25÷20=1.25 sec. After the execution time period tp1 of the first printing command is calculated, the controller 103 may compare a length of the execution time period tp1 and a length of the time period tp2 from the time when the first printing command starts to be executed to the time when the printing interruption occurs. If the execution time period tp1 is greater than the time period tp2 when the interruption occurs (the execution time period, i.e., tp1=1.25 sec, is greater than the time period, i.e., tp2=0.25 sec, as illustrated in the present embodiment), it indicates that the 3D printing device 100 is executing the first printing command corresponding to the count value stored in the non-volatile memory 105 when the printing interruption occurs. Otherwise, when the execution time period tp1 of the first printing command is less than the time period tp2 when the interruption occurs, it indicates that the 3D printing device 100 completes the execution of the first printing command corresponding to the count value stored in the non-volatile memory 105 when the printing interruption occurs. The count value being 10768 when the printing interruption occurs as an example, where when the execution time period tp1 is less than the time period tp2, the controller may, according to the count value which is 10768, employ a printing command executed after the first printing command (i.e., the G-code of column No. 10768) corresponding to the count value as the new first printing command (which is the G-code of column No. 10769), employ the original first printing command (which the G-code of column No. 10768) as the new second printing command and deduct the time period tp2 by the execution time period tp1 to employ it as a time period tp2' (which is not shown) from the time when the new first printing command starts to be executed to the time when the printing interruption occurs. In this way, the controller 103 finally may estimate the G-code of a specific column number which is being executed by the 3D printing device 100 when the interruption occurs by repeatedly performing the step of obtaining the new first printing command.

In an embodiment of the invention, when the 3D printing device 100 is restarted from the printing interruption, the controller 103 of the 3D printing device 100 may analyze the executed G-codes to quickly find out the column number of the G-code which is being executed when the printing interruption occurs. To be specific, taking FIG. 2 for example, if the printing interruption occurs, and the 3D printing device 100 is reset for resuming printing when the G-code of column No. 10769 is executed, since the specific G-code of the desired column number is incapable of being obtained by directly searching the G-codes, the controller 103 starts to read from the G-code of the first column, and ignores the G-codes whose column numbers are less than the count value stored in the non-volatile memory 105 until the first printing command (i.e., the G-code of column No.

10769) corresponding to the count value stored in the non-volatile memory 105 is read. Before the first printing command is read, the controller 103 only reads but not executes the printing commands executed before the first printing command (which the G-codes located before column No. 10769), that is, prevents the print head from moving correspondingly, thereby speeding up the procedure of resume printing and avoiding unnecessary power consumption. After the first printing command corresponding to the count value stored in the non-volatile memory 105 is read, the controller 103 may obtain a correct start position according to the printing position included in the second printing command (which is the printing position included in the G-code of column No. 10768 in the present embodiment). Thereafter, the controller 103 may calculate the interruption position according to the correct start position, the print head moving rate corresponding to the first printing command (i.e., the G-code of column No. 10769), the time period from the time when the first printing command is executed to the time when the printing interruption occurs and the printing position included in the first printing command (i.e., the G-code of column No. 10769).

The aforementioned process of the embodiment is just used to calculate the position where the print head is calculated. During this process, the 3D printing device 100 may, for example, use the controller 103 therein to calculate the correct start position (which is printing position included in the second printing command, i.e., the printing position included in the G-code of column No. 10768 in the present embodiment) for the print head 101 to execute the first printing command after the multiple executed printing commands are executed. When the printing position included in the second printing command is the same as the calculated correct start position, the controller 103 may calculate the interruption position according to the correct start position, the print head moving rate corresponding to the first printing command (i.e., the G-code of column No. 10769), the time period from the time when the first printing command is executed to the time when the printing interruption occurs and the printing position included in the first printing command (i.e., the G-code of column No. 10769).

Figure 3:
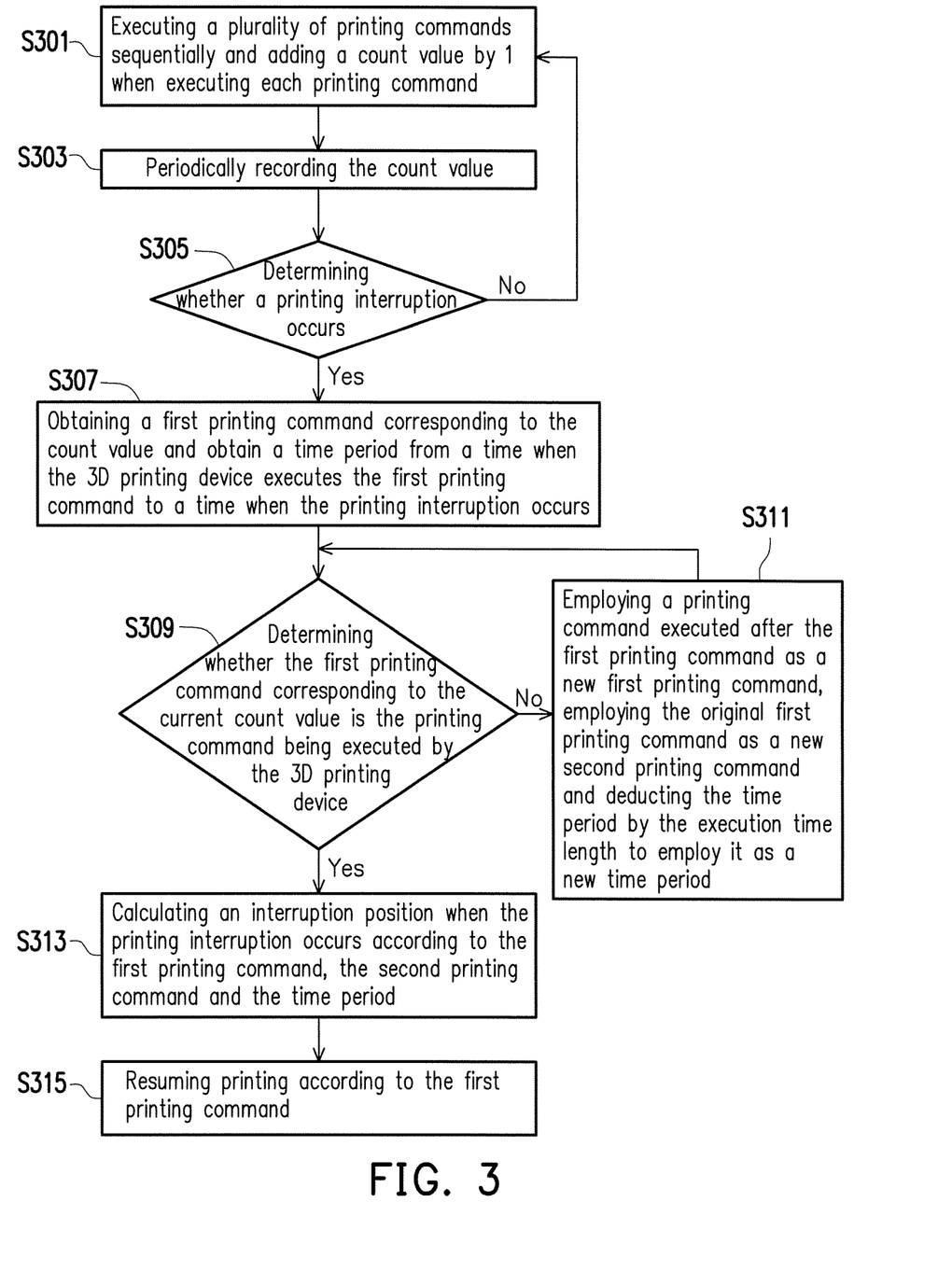
FIG. 3 is a flowchart illustrating a resume printing method according to an embodiment of the invention.

FIG. 3 is a flowchart illustrating a resume printing method according to an embodiment of the invention. The method is adapted for the 3D printing device 100. In step S301, the controller 103 may execute a plurality of printing commands sequentially to control the print head 101 of the 3D printing device 100 for printing, and adds a count value by 1 when executing any one printing command. In step S303, the non-volatile memory 105 may periodically record the count value according to a predetermined cycle. The sequence of steps S301 and S303 may be adjusted according to the user's demand and is not limited in the invention. Then, in step S305, the controller 103 may determine whether a printing interruption occurs and returns to step S301 if no printing interruption occurs, or otherwise, enters step S307.

In step S307, the controller 103 reads the count value stored in the non-volatile memory 105, so as to obtain a first printing command corresponding to the count value and obtain a time period tp from a time when the 3D printing device 100 executes the first printing command to a time when the printing interruption occurs. Thereafter, in step S309, the controller 103 may determine whether the first printing command corresponding to the current count value is the printing command being executed by the 3D printing device 100 when the printing interruption occurs by comparing an execution time length of the first printing command with the time period from the time when the first printing command starts to be executed to the time when the printing interruption occurs. If the first printing command is not the printing command executed when the printing interruption occurs, the method enters step S311. Specifically, the controller 103 may estimate a G-code being executed by the 3D printing device 100 when the interruption occurs according to the first printing command corresponding to the current count value, a second printing command executed before the first printing command, the time period from the time when the first printing command starts to be executed to the time when the printing interruption occurs and a print head moving rate corresponding to the first printing command. Then, in step S311, the controller 103 may employ a printing command executed after the original first printing command as a new first printing command, employ the original first printing command as a new second printing command and deduct the time period from the time when the 3D printing device 100 executes the original first printing command to the time when the printing interruption occurs by the execution time length calculated in step S305 to employ it as a new time period tp from a time when the new first printing command starts to be executed to the time when the printing interruption occurs. Then, step S309 is re-performed.

In step S309, if the controller 103 determines that the first printing command is the printing command executed when the printing interruption occurs, the method enters step S313. In step S313, the controller 103 may calculate an interruption position when the printing interruption occurs according to the first printing command, the second printing command executed before the first printing command and the time period. To be specific, the controller 103 may calculate a displacement vector and a displacement amount corresponding to the displacement vector according to a printing position included in the first printing command and a printing position included in the second printing command. Additionally, the controller 103 may calculate a moving distance according to the print head moving rate corresponding to the first printing command and the time period. Lastly, the controller 103 may obtain an interruption position when the printing interruption occurs according to the printing position included in the second printing command, the displacement vector, the displacement amount and the moving distance.

When step S313 is finished, in step S315, the controller 103 may resume printing from the interruption position according to the first printing command.

In light of the foregoing, the invention provides a 3D printing device and a resume printing method thereof which can calculate the interruption position when the printing interruption occurs after the printing interruption occurs to the 3D printing device. When the 3D printing device is about to resume printing, the controller can control the print head to move to the correct interruption position and continue to complete the printing command which is unfinished when the printing interruption occurs. Thereby, the 3D printing device of the invention can correctly resume 3D printing, without an uninterruptible power supply (UPS) installed thereon when the printing interruption occurs. It should be mentioned that in addition to being applied in the occurrence of the unexpected printing interruption, the resume printing method provided by the invention may also be applied in, for example, a situation where two different 3D printing devices are used to complete a 3D printing operation. For instance, the user can use the resume printing method provided by the invention to continuously complete a 3D printing operation in different locations using different 3D printing devices but the same printing code set, where the printing code set may be exchanged between the two 3D printing devices through, for example, a cloud manner, but the invention is not limited thereto.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A resume printing method, adapted for a three-dimensional (3D) printing device, comprising:
    executing a plurality of printing commands sequentially to control a print head of the 3D printing device for printing;
    adding a count value by 1 when a printing command is executed;
    periodically recording the count value in a non-volatile memory according to a predetermined cycle; and
    when a printing interruption occurs, obtaining a first printing command executed while the printing interruption occurs and resuming printing according to the first printing command,
    wherein the step of resuming printing according to the first printing command comprises:
        when the printing interruption occurs, reading the count value stored in the non-volatile memory to obtain the first printing command corresponding to the count value and obtain a time period from a time when the 3D printing device started executing the first printing command to a time when the printing interruption occurred;
        calculating an interruption position when the printing interruption occurred according to the first printing command, a second printing command executed before the first printing command and the time period; and
        resuming printing from the interruption position according to the first printing command.

2. The method according to claim 1, wherein each of the printing commands at least comprises a printing position, and when a value of the time period is 0, the printing position comprised in the second printing command is employed as the interruption position to resume printing.

3. The method according to claim 1, wherein each of the printing commands at least comprises a printing position and a print head moving rate corresponding to each of the printing commands, and the step of calculating the interruption position when the printing interruption occurs according to the first printing command, the second printing command executed before the first printing command and the time period comprises:
    calculating a displacement vector and a displacement amount corresponding to the displacement vector according to the printing position comprised in the first printing command and the printing position comprised in the second printing command;
    calculating a moving distance according to the print head moving rate corresponding to the first printing command and the time period; and
    obtaining the interruption position according to the printing position comprised in the second printing command, the displacement vector, the displacement amount and the moving distance.

4. The method according to claim 1, wherein each of the printing commands at least comprises a printing position and a print head moving rate corresponding to each of the printing commands, and the resume printing method further comprises:
    verifying whether a printing position comprised in the second printing command is the same as a first printing position after a plurality of executed printing commands are executed, wherein the executed printing commands are located among the printing commands and executed before the first printing command; and
    when the printing position comprised in the second printing command is verified as the same as the first printing position, calculating the interruption position according to the first printing position, the print head moving rate corresponding to the first printing command, the time period and the printing position comprised in the first printing command.

5. The method according to claim 1, wherein each of the printing commands is a G-code.

6. A 3D printing device, comprising:
    a print head;
    a controller, coupled to the print head and configured to execute a plurality of printing commands sequentially to control the print head for printing; and
    a non-volatile memory, coupled to the controller and configured to periodically record a count value according to a predetermined cycle,
    wherein the controller, when a printing interruption occurs, is configured to:
        read the count value stored in the non-volatile memory to obtain the first printing command, which is executed when the printing interruption occurred;
        obtain a time period from a time when the 3D printing device started executing the first printing command to a time when the printing interruption occurred;
        calculate an interruption position when the printing interruption occurred according to the first printing command, a second printing command executed before the first printing command and the time period; and
        control the print head to resume printing from the interruption position according to the first printing command.

7. The 3D printing device according to claim 6, wherein each of the printing commands at least comprises a printing position, and
    wherein the controller, when a value of the time period is 0, is configured to:
        employ the printing position comprised in the second printing command as the interruption position; and
        control the print head to resume printing.

8. The 3D printing device according to claim 6, wherein each of the printing commands at least comprises a printing position and a print head moving rate corresponding to each of the printing commands, and
    the controller is configured to calculate the interruption position when the printing interruption occurred according to the first printing command, the second printing command executed before the first printing command and the time period by:
        calculating a displacement vector and a displacement amount corresponding to the displacement vector according to the printing position comprised in the first printing command and the printing position comprised in the second printing command;

calculating a moving distance according to the print head moving rate corresponding to the first printing command and the time period; and obtaining the interruption position according to the printing position comprised in the second printing command, the displacement vector, the displacement amount and the moving distance.

9. The 3D printing device according to claim 6, wherein each of the printing commands at least comprises a printing position and a print head moving rate corresponding to each of the printing commands, and the controller when the printing interruption occurred, is further configured:

verify whether a printing position comprised in the second printing command is the same as a first printing position after a plurality of executed printing commands are executed, wherein the executed printing commands are located among the printing commands and executed before the first printing command; and calculate, when the printing position comprised in the second printing command is verified as the same as the first printing position, calculating the interruption position according to the first printing position, the print head moving rate corresponding to the first printing command, the time period and the printing position comprised in the first printing command.

10. The 3D printing device according to claim 6, wherein each of the printing commands is a G-code.

* * * * *